Figure 1:
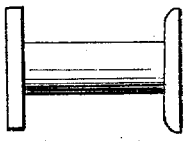
Figure 2:
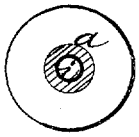

7937X

N. Rider.

Bobbin.

Patented Dec. 31, 1833.

N. PETERS, PHOTO-LITHOGRAPHER, WASHINGTON, D. C.

12/31/1833 1937X

Dec 31 1833 79

Nathaniel Rider Millbury Mass.

Letters Patent the Schedule referred to in these Letters Patent and making part
of the same containing a description in the words of the said Nathan
-el Rider himself of his improvement in the construction of the
common cotton Spool or Bobbin To all to whom these presents shall come Be it known that
I Nathaniel Rider of Millbury in the County of Worcester and
Commonwealth of Massachusetts Manufacturer have invented
a new and useful improvement in the construction of the common cotton
Spool and Bobbin. and that the following is a full and exact de-
scription of the construction and operation of the same as invented
improved by me and described in the words following to wit
The objection to the Spool or Bobbin as now used consists in the fact
that the friction between the boxes of the bobbin and the spindle on
which it turns is so great that the bobbin adhering to the spindle
revolves with it. The result of this difficulty is that the bobbin at
one time goes too fast and at another too slow. and beside deranging
the work often breaks the thread. All these difficulties are removed
by the introduction of my bobbin which is constructed after this
manner. Instead of making the boxes of the bobbin of wood or
Lignum vitae I make them of metal. These metallic boxes are
not so deep or thick as those made of wood in the common way
In consequence of this arrangement the bearing on the spindle
is greatly diminished and by the removal of the friction between the
boxes and the Spindle the bobbin is permitted to follow the spindle
with a motion more easy and uniform and at the same [illegible]
accelerated. Thus by the application of these metallic boxes the
friction between the boxes of the bobbin and spindle is dimin
-ished in two ways. the bearing on the spindle is not about one fourth

1937X as much as it is in those made of wood in the usual way and the
substance of the box being metallic is a great deal harder. It would
be much less even if the bearing were the same in consequence of which
the friction under the bobbin may be diminished by having a
smaller cloth washer and give the yarn a much lighter & easier
draught — By the introduction of these metallic boxes the fric-
tion between the Boxes and spindle is so far removed that by the increased
velocity of the bobbin together with a more regular and uniform
motion. almost double the quantity of yarn may be produced.
The operation of the machine is the same as that now in use and
the bobbin is of similar shape. And all I claim as my improve-
ment is the introduction of metallic boxes into the bobbin used
in spinning cotton warp yarn or twisting cotton thread Recd. Witnesses
[illegible] Wm Rider
Christopher Columbus Baldwin Nathaniel Rider Dr in port folio 500 [illegible]